(No Model.)
R. KROSEBERG & E. STRAUB.
METHOD OF AND APPARATUS FOR REGULATING TEMPERATURE OF ELECTROLYTES.
No. 563,972. Patented July 14, 1896.
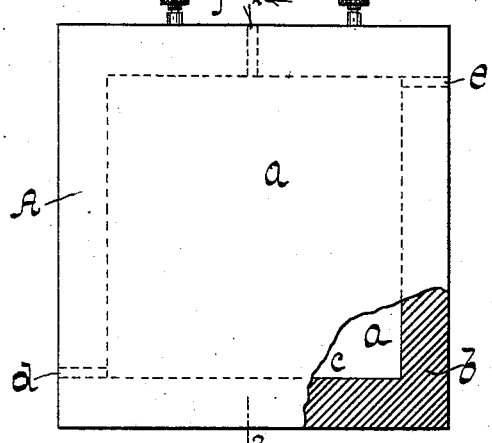
Fig. I.
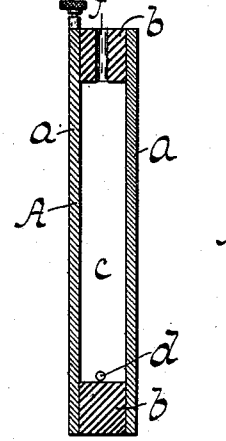
Fig. II.
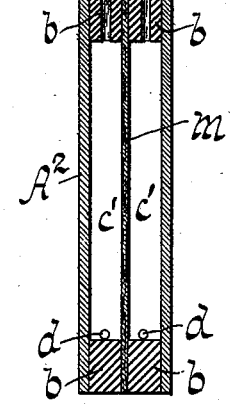
Fig. III.
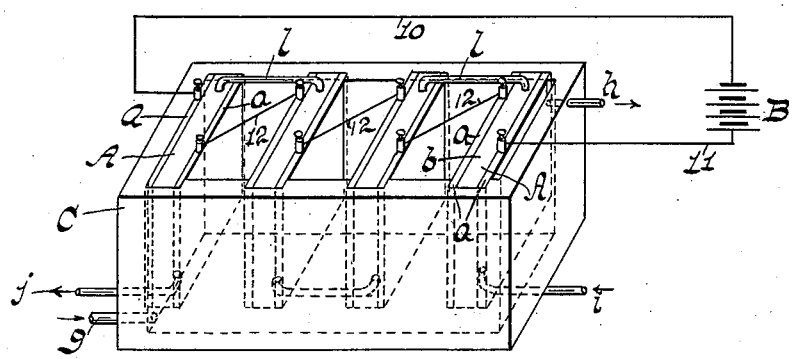
Fig. IV.
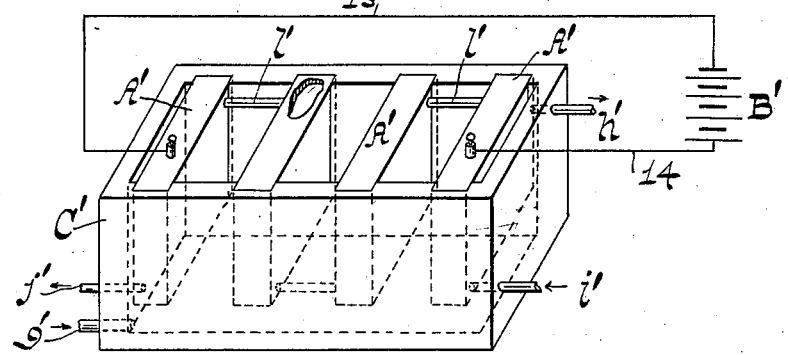
Fig. V.
WITNESSES:
Chas. W. Thomas
Eugenie A. Persides
INVENTORS:
Rudolf Kroseberg,
Eugen Straub,
BY
A. Faber du Faur
ATTORNEY

UNITED STATES PATENT OFFICE.

RUDOLF KROSEBERG AND EUGEN STRAUB, OF BERLIN, GERMANY, ASSIGNORS TO SAID KROSEBERG.

METHOD OF AND APPARATUS FOR REGULATING TEMPERATURE OF ELECTROLYTES.

SPECIFICATION forming part of Letters Patent No. 563,972, dated July 14, 1896.

Application filed July 13, 1893. Serial No. 480,375. (No model.) Patented in Germany March 10, 1894, No. 73,662.

*To all whom it may concern:*

Be it known that we, RUDOLF KROSEBERG, a subject of the King of Prussia, Emperor of Germany, and EUGEN STRAUB, a subject of the Grand Duke of Baden, residing at Berlin, Prussia, Germany, have invented new and useful Improvements in Methods of and Apparatus for Regulating the Temperature of Electrolytes, (for which we have obtained Letters Patent in Germany, No. 73,662, dated March 10, 1894,) of which the following is a specification.

Our invention has reference to a method for the regulation of the temperature of the electrolyte in electric separation and to apparatus for carrying out the same.

It has heretofore been quite difficult to heat, to cool, or, in general, to maintain the electrolyte at a certain constant temperature, but for many purposes the regulation of the temperature is very important.

In carrying out our process we make use of hollow electrodes, which are cooled or heated, as required, by a current of liquid passing either through the electrode or exterior thereto, according to circumstances, whereby the electrolyte can be held at any desired temperature.

The apparatus used in carrying out our process is illustrated in the annexed drawings, in which—

Figure 1 represents a face view of an electrode constructed according to our invention. Fig. 2 is a section on the line 2 2, Fig. 1. Fig. 3 is a vertical section of a modification. Fig. 4 is a perspective showing a complete apparatus. Fig. 5 is a similar view of a modified form.

Similar letters of reference designate corresponding parts throughout the several views of the drawings.

Referring at present to Figs. 1 and 2 of the drawings, the letter A designates the electrode, composed of two metallic plates $a$ $a$ secured to a hollow frame $b$ of insulating material and forming with the same a chamber $c$, which is provided with a suitable inlet $d$ and outlet $e$ for the introduction and outflow of the electrolyte. A suitable opening $f$ may be provided, if desired, for the escape of gases. The plates $a$ $a$ are secured to the frame $b$ by the use of the usual rubber cement or by other known means for making joints of this description. The electrode thus constructed can be suspended in a suitable tank filled with water or other fluid the temperature of which can be regulated to a degree best suited for the special electrolytic separation. In Fig. 4 we have shown a series of such electrodes A placed in a tank C, through which a circulation of water is maintained by a pump, or connection with a tank or main through the pipes $g$ $h$ in a usual manner.

The sides of the tank C are provided with suitable vertical grooves $t$, into which the electrodes can be inserted and whereby the electrodes are held in place.

10 and 11 are the wires from a source of electricity B connected to the terminal electrodes. The metallic plates of the electrodes are alternately connected by suitable wires 12. One side of the electrode thus forms the anode and the opposite side the cathode. The electrolyte is filled into the chamber of the electrode A at the beginning of the series through a suitable pipe $i$ and discharged from the electrode at the end of the series through a pipe $j$, suitable connecting-pipes $l$ being provided. Of course each electrode may be provided with a separate inlet and outlet to maintain a circulating of the electrolyte therethrough.

From the above it will be seen that the electrolytic separation takes place at the inner sides of the electrodes, but it is evident that the separation can be caused to take place at the exterior sides of the electrodes. In other words, instead of filling the electrolyte into the electrodes the same may be placed in a tank and the electrodes immersed in the electrolyte. Such a construction we have shown in Fig. 5. Referring to this figure, C' designates the tank, into which are inserted a number of electrodes A', each consisting simply of a hollow metallic box. One pole of the battery B' is connected by wire 13 to the first electrode and the other to the terminal electrode by wire 14. In this manner one side of the electrode forms the anode and the opposite side the cathode.

A suitable circulation of the temperature-regulating fluid is maintained through the electrodes through inlet-pipe $i'$ and outlet $j'$, the electrodes being connected by suitable rubber pipes $l'$. Circulation of the electrolyte is maintained through the inlet-pipe $g'$ and outlet $h'$.

In Fig. 3 we have shown the electrode $A^2$ provided with a diaphragm $m$ for separating the chamber into two compartments $c'$ $c'$.

With electrodes of this character different temperatures may be maintained in the separated compartments of the electrode, or different electrolytes may be treated at the same time.

What we claim as new is—

1. The herein-described method for the regulation of the temperature of electrolytes, which consists in passing a continuous current of a regulating fluid in contact with a series of hollow electrodes having their terminal electrodes connected with the opposite poles of the source of electricity; each electrode thus forming both anode and cathode.

2. In an electrolytic apparatus, the combination of a tank, a series of compound, hollow electrodes disposed in said tank, each embodying a distinct anode and cathode plate at opposite sides and a chamber between the same, connecting-pipes between said electrodes, means for establishing a circulation of temperature-regulating fluid in contact with said electrodes, a source of electricity, and electrical connections, substantially as described.

3. In an electrolytic apparatus, the combination of a tank, a series of compound electrodes disposed in said tank, each embodying a distinct anode and cathode plate at opposite sides and a chamber between the same, connecting-pipes between the said electrodes, a source of electricity, and wires alternately connecting the anode and cathode plates of adjacent electrodes, substantially as described.

In testimony whereof we have signed our names to this specification in the presence of two subscribing witnesses.

RUD. KROSEBERG.
EUGEN STRAUB.

Witnesses:
L. GRAMBORG,
GUSTAV HULSMANN.